(12) United States Patent
Enomoto et al.

(10) Patent No.: US 9,357,096 B2
(45) Date of Patent: May 31, 2016

(54) DOCUMENT READING DEVICE

(71) Applicants: Shinnosuke Enomoto, Yamanashi (JP); Junya Ozawa, Yamanashi (JP)

(72) Inventors: Shinnosuke Enomoto, Yamanashi (JP); Junya Ozawa, Yamanashi (JP)

(73) Assignee: NISCA CORPORATION, Minamikoma-gun, Yamanashi-ken (JP)

( * ) Notice: Subject to any disclaimer, the term of this patent is extended or adjusted under 35 U.S.C. 154(b) by 0 days.

(21) Appl. No.: 14/438,472

(22) PCT Filed: Oct. 29, 2013

(86) PCT No.: PCT/JP2013/079321
§ 371 (c)(1),
(2) Date: Apr. 24, 2015

(87) PCT Pub. No.: WO2014/069486
PCT Pub. Date: May 8, 2014

(65) Prior Publication Data
US 2015/0288844 A1    Oct. 8, 2015

(30) Foreign Application Priority Data

Oct. 30, 2012  (JP) .................................. 2012-238506

(51) Int. Cl.
*H04N 1/04* (2006.01)
*H04N 1/10* (2006.01)
*H04N 1/00* (2006.01)
*H04N 1/195* (2006.01)

(52) U.S. Cl.
CPC ............. *H04N 1/10* (2013.01); *H04N 1/00551* (2013.01); *H04N 1/00557* (2013.01); *H04N 1/00909* (2013.01); *H04N 1/195* (2013.01)

(58) Field of Classification Search
CPC .. H04N 1/10; H04N 1/00551; H04N 1/00557

USPC ......................... 358/496, 498, 483, 482, 461; 250/208.1, 234–236, 289
See application file for complete search history.

(56) References Cited

U.S. PATENT DOCUMENTS 7,379,216 B2 *  5/2008  Yang .................. H04N 1/00045
                                                   358/406
7,433,097 B2 * 10/2008  Spears .................. H04N 1/047
                                                   250/368

(Continued)

FOREIGN PATENT DOCUMENTS

| JP | H03-052377 A | 3/1991 |
| JP | 2005-080040 A | 3/2005 |
| JP | 2007-074445 A | 3/2007 |

OTHER PUBLICATIONS

PCT, "International Search Report for International Application No. PCT/JP2013/079321".

*Primary Examiner* — Cheukfan Lee
(74) *Attorney, Agent, or Firm* — Manabu Kanesaka

(57) ABSTRACT

Provided is a document reading device capable of performing shading correction and making it difficult for foreign matters to enter inside the device. A document reading device includes a reading unit, a glass unit, and a closing member. The reading unit has a light source and reads a document. The glass unit has a glass plate that transmits light emitted from the light source and a reference member serving as a reference for shading correction of a reading optical system. The glass unit is disposed with a space provided with respect to the reading unit and slid between a first position where the light emitted from the light source transmits the glass plate and a second position where the light emitted from the light source reaches the reference member with the space being maintained. The closing member is positioned downstream of the glass plate and the reference member of the glass unit in a document conveying direction and fills at least a part of the space provided between the reading unit and the glass unit.

7 Claims, 7 Drawing Sheets

(56) References Cited

U.S. PATENT DOCUMENTS

| | | | |
|---|---|---|---|
| 7,692,818 B2 * | 4/2010 | Futami | H04N 1/121 358/3.26 |
| 8,665,503 B2 * | 3/2014 | Yoshimoto | G03G 15/605 358/408 |
| 2001/0026380 A1 | 10/2001 | Imoto | |
| 2007/0223061 A1 | 9/2007 | Tanaka et al. | |
| 2014/0226191 A1 * | 8/2014 | Enomoto | H04N 1/00588 358/496 |
| 2015/0222777 A1 * | 8/2015 | Enomoto | H04N 1/123 358/496 |
| 2015/0288842 A1 * | 10/2015 | Enomoto | H04N 1/00989 358/474 |

* cited by examiner

DOCUMENT READING DEVICE

RELATED APPLIACTIONS

The present application is National Phase of International Application No. PCT/JP2013/079321 filed Oct. 29, 2013, and claims priority from Japanese Application No. 2012-238506, filed Oct. 30, 2012, the disclosure of which is hereby incorporated by reference herein in its entirety.

TECHNICAL FIELD

The present invention relates to a document reading device that reads both surfaces of a document and, more particularly, to a document reading device provided with a document conveying device having a reading unit for reading one side of a document whose other side has been read.

BACKGROUND ART

Conventionally, a document reading device that irradiates a document with light emitted from a light source and detects light reflected from the document to thereby read the document has been used. There is proposed, as a conventional document reading device, a device provided with a white reference member for performing shading correction of a reading optical system. In this device, the reference member is provided on a glass plate that closes an opening formed in a reading unit for reading a document. The glass plate is slid so that the reference member is located at a position for reflecting light from a light source when a reference value for performing shading correction needs to be obtained and that a portion of the glass plate on which the reference member is not provided and through which light can be transmitted is located at the above-mentioned position when the document reading is performed (see, for example, Patent Document 1).

CITATION LIST

Patent Document

[Patent Document 1] Jpn. Pat. Appln. Laid-Open Publication No. 2007-74445

DISCLOSURE OF THE INVENTION

Problems to be Solved by the Invention

As a document reading device that performs shading correction of a reading optical system, a device having a configuration in which the glass plate is slid with a space S being maintained between the glass plate and the reading unit. In this device, foreign matters such as dust may enter inside of the device from outside through the space. When the foreign matters are introduced inside the device and adhered to the reference member, a pixel corresponding to a portion where the foreign matters are adhered to the reference member and a pixel corresponding to a portion where the foreign matters are not adhered to the reference member have different reference values from each other. That is, when the foreign matters are adhered to the reference member, there may occur a problem such as appearance of stripes in an image formed after reading of the entire document. Similarly, also when the foreign matters are adhered to the glass plate, there may occur a problem such as appearance of stripes in an image formed after reading of the entire document. Further, also when the foreign matters are introduced inside the device and adhered to an optical element, in a reading unit, there may occur the same problem as that occurs when the foreign matters are adhered to the reference member of glass plate.

An object of the present invention is to provide a document reading device capable of performing shading correction of a reading optical system and making it difficult for foreign matters to enter inside the device.

Means for Solving the Problems

A document reading device according to one aspect of the present invention includes a reading unit, a glass unit, and a closing member. The reading unit has a light source and reads a conveyed document. The glass unit has a glass plate that transmits light emitted from the light source provided in the reading unit and a reference member serving as a reference for shading correction of a reading optical system performed by the reading unit. The glass is disposed with a space provided with respect to the reading unit and slid between a first position where the light emitted from the light source transmits the glass plate and a second position where the light emitted from the light source reaches the reference member with the space being maintained. The closing member is positioned downward of the glass plate and reference member of the glass unit in a document conveying direction regardless of whether the glass unit is situated at the first position or the second position and attached to one of the reading unit and the glass unit so as to fill at least a part of the space provided between the reading unit and glass unit. The expression "positioned downstream of the glass plate and the reference member of the glass unit" means that the closing member is positioned downstream of a part of the glass plate where the light emitted from the light source provided in the reading unit and reflected light from the document are transmitted and positioned downward of a part of the reference member that light from the light source reaches.

The closing member may have a width extending at least from one end to the other end of a width of the glass plate of the glass unit and may be disposed so as to contact one of the reading unit and the glass unit that the closing member is not attached to over the entire width direction and to partition the space in the document conveying direction into an upstream side where the glass plate and the reference member of the glass unit are included and a downstream side where the glass plate and the reference member of the glass unit are not included.

The reading unit may be positioned above the glass unit, and the closing member may be attached to the glass unit.

The document reading device may further include a lubricant, wherein the closing member may contact one of the reading unit and the glass unit that the closing member is not attached to, and the lubricant may be positioned on one of the reading unit and the glass unit that the closing member is not attached to at a portion contacting the closing member.

The lubricant may have volatility.

The closing member may have an elastic body.

The closing member may further have a contacting member that contacts one of the reading unit and the glass unit that the closing member is not attached to, and a friction coefficient between one of the reading unit and the glass unit that the closing member is not attached to and contacting member may be smaller than a friction coefficient between one of the reading unit and the glass unit that the closing member is not attached to and the elastic member.

Advantages of the Invention

According to the present invention, there is provided a document reading device capable of performing shading correction of a reading optical system and making it difficult for foreign matters to enter inside the device.

BEST MODE FOR CARRYING OUT THE INVENTION

Figure 1:
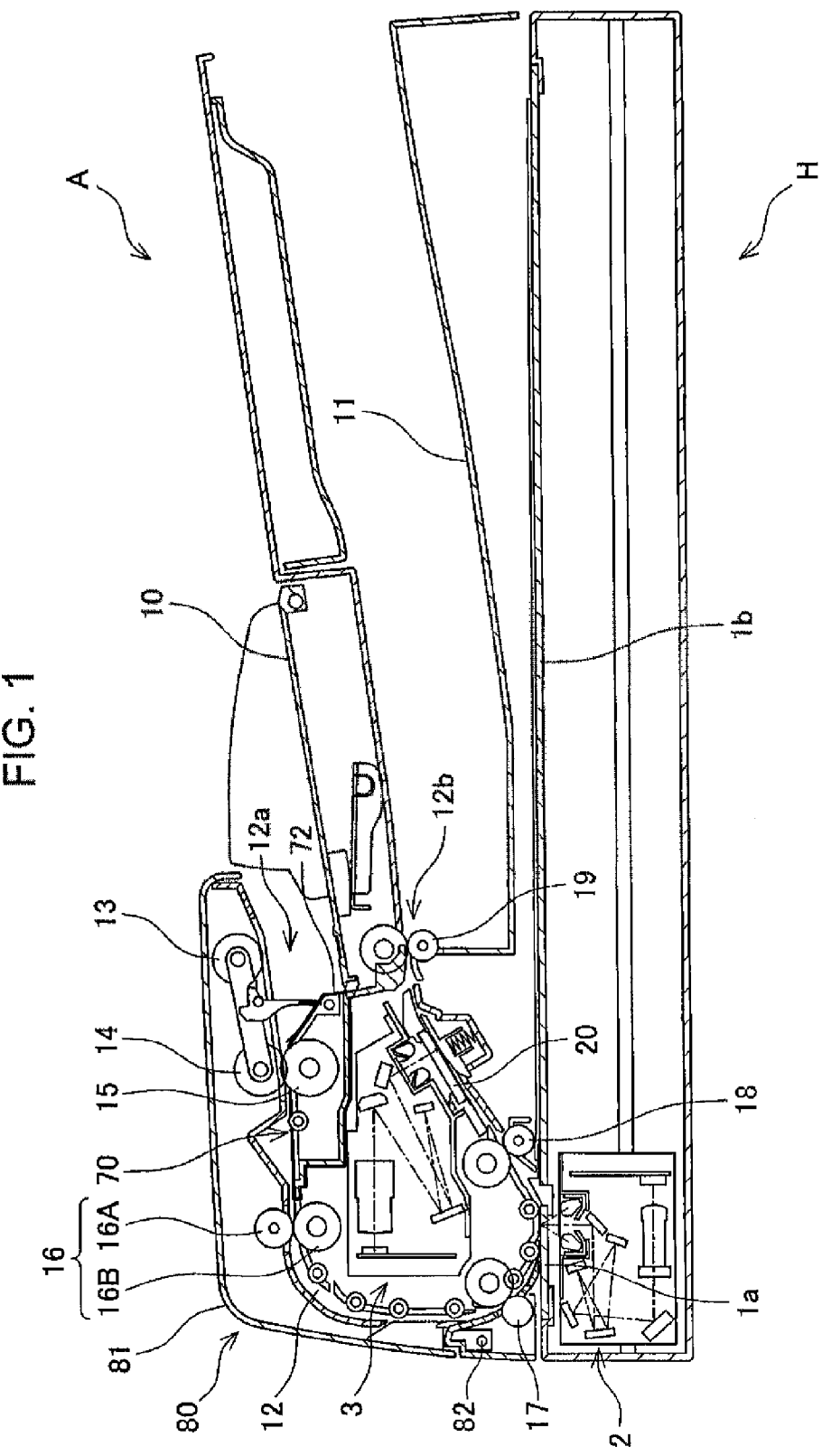
FIG. 1 is a cross-sectional view illustrating an entire configuration of a document reading system according to an embodiment of the present invention.

An embodiment of the present invention will be described below with reference to the drawings. FIG. 1 is a cross-sectional view illustrating an entire configuration of a document reading system according to the embodiment of the present invention. The document reading system according to the present embodiment has a first document reading device H and a second document reading device A. Both the first document reading device H and the second document reading device A are devices for reading a document. The first document reading device H does not have a function of conveying the document, while the second document reading device A has a function of conveying the document. The second document reading device A is mounted to the first document reading device H through a not illustrated hinge. The hinge connects the first document reading device H and the second document reading device A such that the second document reading device A is pivotally mounted with respect to the first document reading device H. When the second document reading device A in a state facing the first document reading device H is pivoted in an opening direction, an upper surface of the first document reading device H is opened.

The first document reading device H has a first glass plate 1a, a second glass plate 1b, and a reading carriage 2. The first glass plate 1a is a glass plate that transmits light. The first glass plate 1a is disposed near a connection portion between the first document reading device H and the second document reading device A to constitute a part of the upper surface of the first document reading device H. The first glass plate 1a is used for reading one surface of the document conveyed by the second document reading device A. The second glass plate 1b is a glass plate that transmits light. The second glass plate 1b is disposed further away from the connection portion than the first glass plate 1a to constitute a part of the upper surface of the first document reading device H. The second glass plate 1b is larger in size than the first glass plate 1a and has a size capable of placing a document such as a book and is used for reading the document placed thereon.

The reading carriage 2 is a unit including a light source, a plurality of mirrors, a lens, and a photoelectric converter including a photoelectric conversion element (CCD). The reading carriage 2 irradiates the document with light from the light source, collects light reflected from the document through the mirrors and the lens and applies photoelectric conversion for document reading. The reading carriage 2 is movable from near the connection portion between the first document reading device H and the second document reading device A to near a part of the second glass plate 1b that is farthest from the connection portion. That is, the reading carriage 2 is movable in a sub-scan direction.

The reading carriage 2 reads, through the first glass plate 1a, one surface of the document which is conveyed to an upper surface of the first glass plate 1a by the second document reading device A while stopping near the connection portion between the first document reading device H and the second document reading device A. The reading carriage 2 scans the document in the sub-scan direction to thereby read the document placed on the second glass plate 1b through the second glass plate 1b.

As described above, the second document reading device A is a device that has the document conveying function and has a sheet supply tray 10, a sheet discharge tray 11, and a document conveying path 12. The sheet supply tray 10 is a tray on which a document to be conveyed is placed. A plurality of documents can be placed on the sheet supply tray 10. The sheet supply tray 10 is provided so as to be positioned above the sheet discharge tray 11 in a state where the second document reading device A covers the upper surface of the first document reading device H.

The sheet supply tray 10 is provided on the most upstream side in a document conveying direction and is provided with a regulation wall 72 for regulating a position of a leading end of the document placed on the sheet supply tray 10. The regulation wall 72 is provided so as to connect to the document conveying path 12. Hereinafter, "upstream side in document conveying direction" is referred to merely as "upstream side", and "downstream side in document conveying direction" is referred to merely as "downstream side".

The sheet discharge tray 11 is a tray for housing the read document. The document conveying path 12 is a U-shaped path extending from the sheet supply tray 10 to the sheet discharge tray 11. The document is conveyed along the document conveying path 12 from the sheet supply tray 10 to the sheet discharge tray 11. Along the document conveying path 12, there are provided a delivery roller 13, a feeding roller 14, a separation roller 15, a resist roller pair 16 (resist rollers 16A and 16B), a conveying roller pair 17, a conveying roller pair 18, and a discharge roller pair 19.

The document conveying path 12 is constituted by an upstream side path, an intermediate path, and a downstream side path. The upstream side path is a path extending from a sheet supply port 12a through which the document on the sheet supply tray 10 is delivered up to the resist roller pair 16. The intermediate path is a curved path extending from the resist roller pair 16, through the first glass plate 1a, up to the conveying roller pair 18. The downstream side path is a path extending from the conveying roller pair 18 up to a sheet discharge port 12b at which the discharge roller pair 19 is disposed.

The delivery roller 13 is a roller brought into contact with the document placed on the sheet supply tray 10 with its leading end aligned by the regulation wall 72 and thereby delivers the document downstream. The feeding roller 14 is a roller that feeds the document delivered by the delivery roller 13. The separation roller 15 is a roller brought into contact with the feeding roller 14 so as to feed the document one by one. The resist roller pair 16 is a roller pair that receives an abutment of the leading end of the document fed by the feeding roller 14 for alignment and then feeds the document downstream.

The conveying roller pair 17 is a roller pair disposed downstream of the resist roller pair 16 and upstream of the first glass plate 1a. The conveying roller pair 18 is a roller disposed downstream of the first glass plate is and upstream of the discharge roller pair 19. Both the conveying roller pairs 17 and 18 are configured to convey the document downstream. The discharge roller pair 19 is a roller pair disposed downstream of the conveying roller pair 18 and conveys the document to the sheet discharge tray 11.

The second document reading device A further has a reading unit 3 and a sheet feed cover 81. The reading unit 3 is a unit for reading the document. Details of the reading unit 3 will be described later. The sheet feed cover 81 covers the sheet supply port 12a, a part of the document conveying path 12, and the reading unit 3. The delivery roller 13, the feeding roller 14, the resist roller 16A, and the sheet feed cover 81 are unitized to constitute a sheet feed cover unit 80. The sheet feed cover unit 80 is pivotally mounted to a lower portion of the second document conveying device A with a pivotal pin 82 as a supporting point. Inside the sheet feed cover unit 80, a separation guide unit 70 is provided. The separation guide unit 70 is obtained by unitizing the regulation wall 72 and the separation roller 15 (surrounded by a thick line of FIG. 1).

The reading unit 3 is disposed inside the U-shaped document conveying path 12. The reading unit 3 has a light source, a plurality of mirrors, a lens, and a photoelectric converter including a photoelectric conversion element (CCD) and reads the other surface of the document passing through the upper surface of the first glass plate 1a of the first document reading device H. The second document reading device A further has a glass unit 4 including a third glass plate 20. The third glass plate 20 is positioned between the conveying roller pair 18 and the discharge roller pair 19, and one surface thereof functions as a part of the document conveying path 12.

When both surfaces of the document conveyed by the second document reading device A are read, the delivery roller 13, the feeding roller 14, the separation roller 15, the resist roller pair 16, the conveying roller pair 17, and the conveying roller pair 18 sequentially convey the document placed on the sheet supply tray 10 downstream. Finally, the discharge roller pair 19 discharges the document to the sheet discharge tray 11. In this conveyance process, one surface of the document is read by the reading carriage 2 when the document passes through the first glass plate 1a, and the other surface thereof is read by the reading unit 3 when the document passes through the third glass plate 20.

Figure 2:
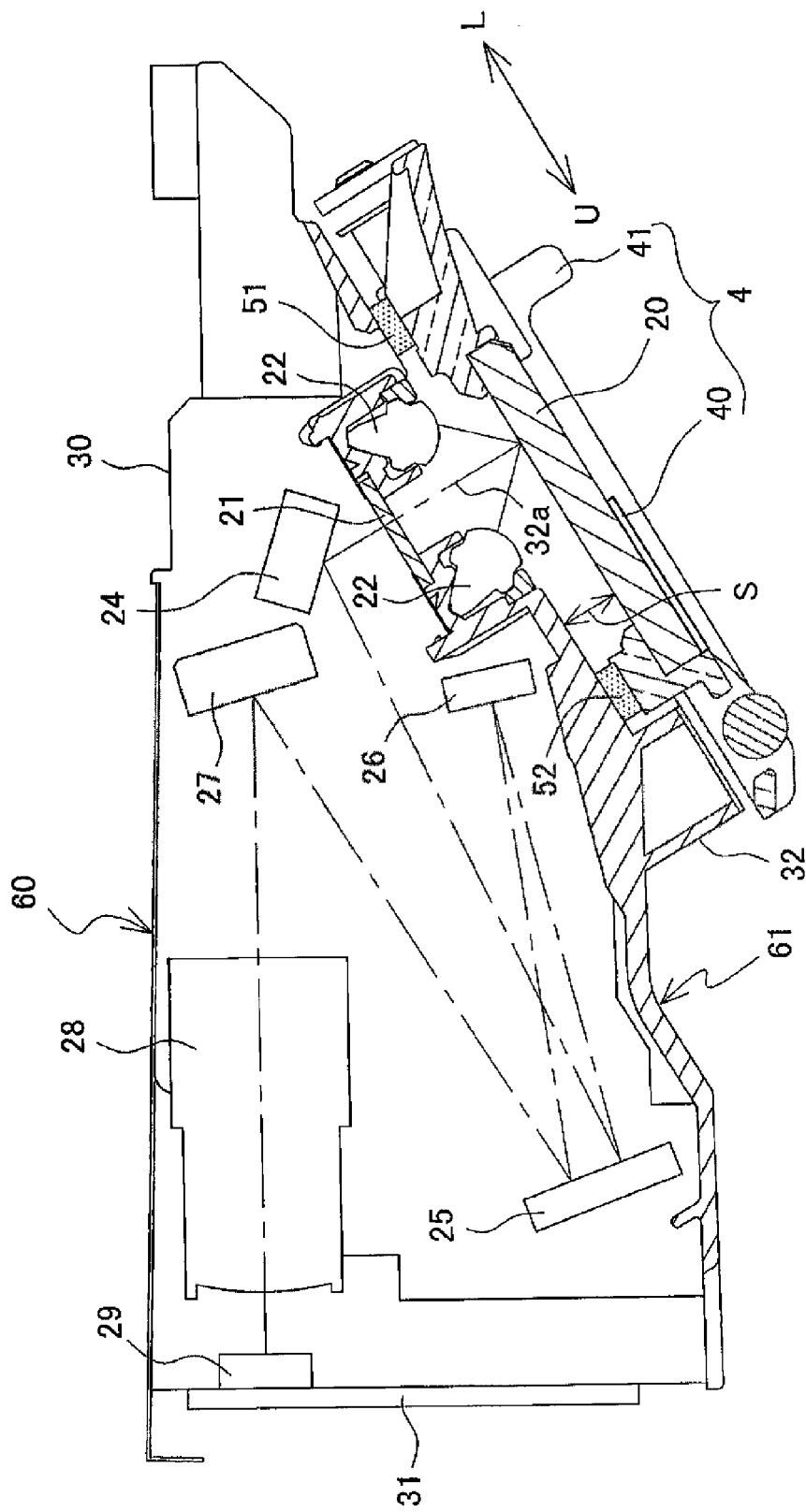
FIG. 2 is an enlarged cross-sectional view of a reading unit and the like illustrated in FIG. 1.

The reading unit 3 and the glass unit 4 will be further described using FIG. 2 and the like. FIG. 2 is an enlarged cross-sectional view of the reading unit 3 and the like illustrated in FIG. 1. The reading unit 3 is positioned above the glass unit 4 and has a light source, four mirrors 24, 25, 26, and 27, a lens 28, and a photoelectric converter including a photoelectric conversion element (CCD) 29. The light source has an LED (not illustrated) that emits light and a light guide body 22 and irradiates the document conveyed through the third glass plate 20 with light. The four mirrors 24, 25, 26, and 27 lead reflected light from the document to the lens 28. The lens 28 converges the reflected light led by the mirrors 24, 25, 26, and 27. The CCD 29 photoelectric-converts the light converged by the lens 28.

The reading unit 3 is constituted by an optical unit 60 including the four mirrors 24, 25, 26, and 27, the lens 28, and the CCD 29 and a light source unit 61 including the LED and the light guide body 22. The optical unit 60 has a first frame 30 and a CCD substrate 31. The first frame 30 serves as an exterior cover of the reading unit 3. The first frame 30 is formed of, e.g., a resin material and has a substantially L-shaped cross-section. The CCD substrate 31 is arranged parallel to a document width direction perpendicular to a document conveying direction and has the CCD 29 mounted thereon.

The light source unit 61 has a second frame 32, two light guide bodies 22, the LED, and an LED substrate (not illustrated). The second frame 32 is mounted to the first frame 30 so as to cover an inside of the first frame 30. The two light guide bodies 22 are each provided at one side of the second frame 32 so as to extend in the width direction of the conveyed document. The LED is a chip-like LED that emits light to be incident on the light guide bodies 22 and is mounted on the LED substrate in parallel to the conveying direction of the conveyed document. A slit 32a is formed in the second frame 32 so as to allow the light reflected from the document to be incident on the mirror 24, and a protective glass 21 is disposed in the slit 32a so as to protect optical components inside the reading unit 3.

In the reading unit 3, the light source irradiates the document through the third glass plate 20 with light, and light reflected from the document is led by the four mirrors 24, 25, 26, and 27 and the lens 28 to the CCD 29, where the light is subjected to photoelectric conversion for document image reading. In this operation, the other surface of the document that passes through the upper surface of the first glass plate 1a of the first document reading device H in FIG. 1 is read.

The glass unit 4 is positioned below the reading unit 3 and has a third glass plate 20 and a reference member 40. The glass unit 4 is disposed such that a space S is provided between the third glass plate 20 and the reading unit 3 and is configured to be slidable in a slide direction UL indicated by an arrow in FIG. 2 with the space S being maintained. A U-side of the slide direction UL is an upstream side, and an L-side thereof is a downstream side.

The third glass plate 20 transmits light emitted from the light source provided in the reading unit 3. The reference member 40 serves a reference for shading correction of a reading optical system performed by the reading unit 3. In the present embodiment, the reference member 40 is white colored and has a stripe shape. The reference member 40 is smaller in size than the third glass plate 20 and is attached to an upstream side portion on one surface of the third glass plate 20. FIG. 2 illustrates a state where the glass unit 4 is situated at a first position. The first position is a position of the glass unit 4 where the light emitted from the light source provided in the reading unit 3 transmits the third glass plate 20. In a state where the glass unit 4 is situated at the first position, the reading unit 3 reads the other surface of the document that passes through the upper surface of the first glass plate 1a of the first document reading device H in FIG. 1.

Figure 3:
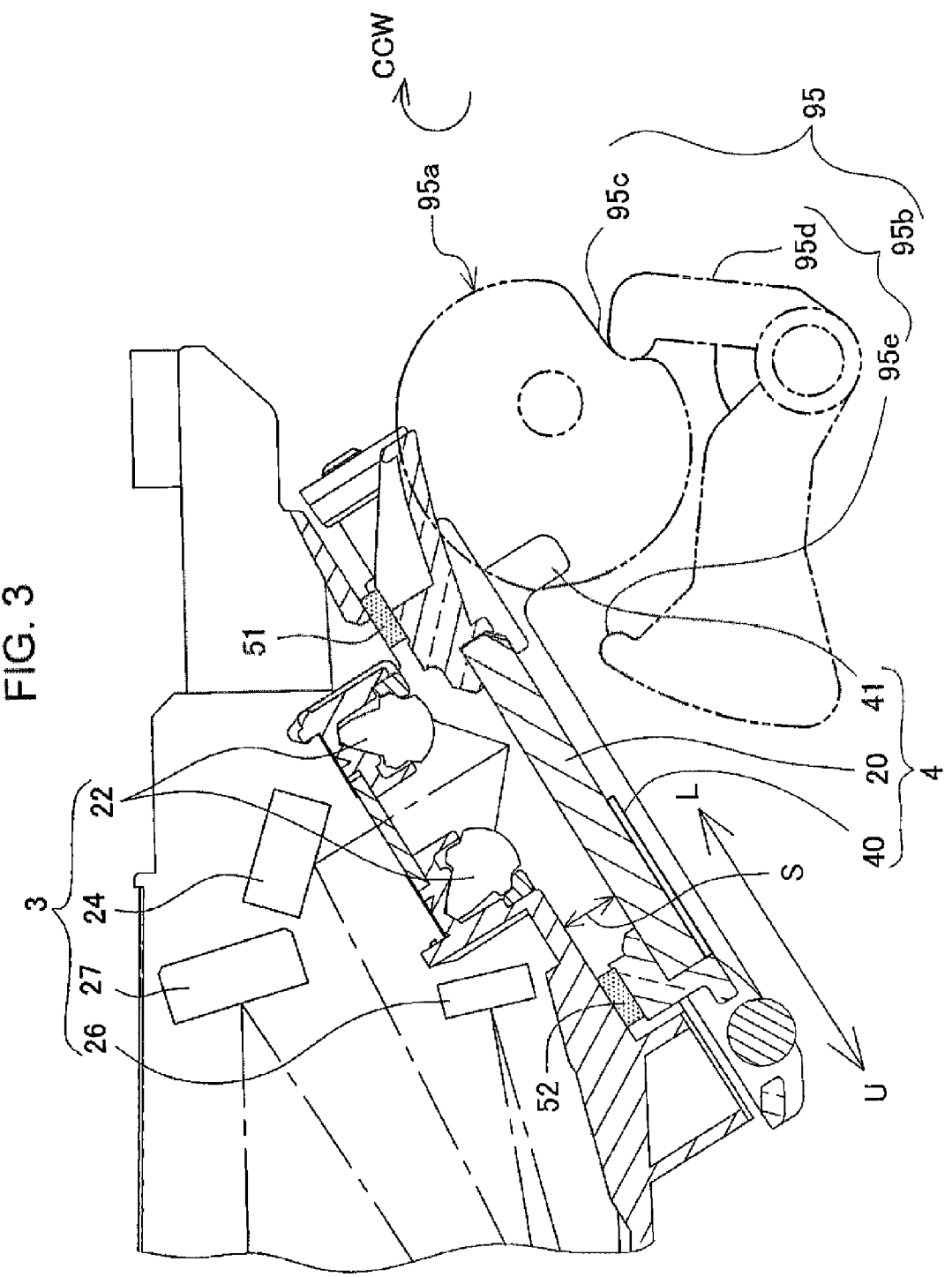
FIG. 3 is a view illustrating, in an enlarged manner, a part of the reading unit illustrated in FIG. 2 and a glass unit and the like illustrated in FIG. 2.
Figure 4:
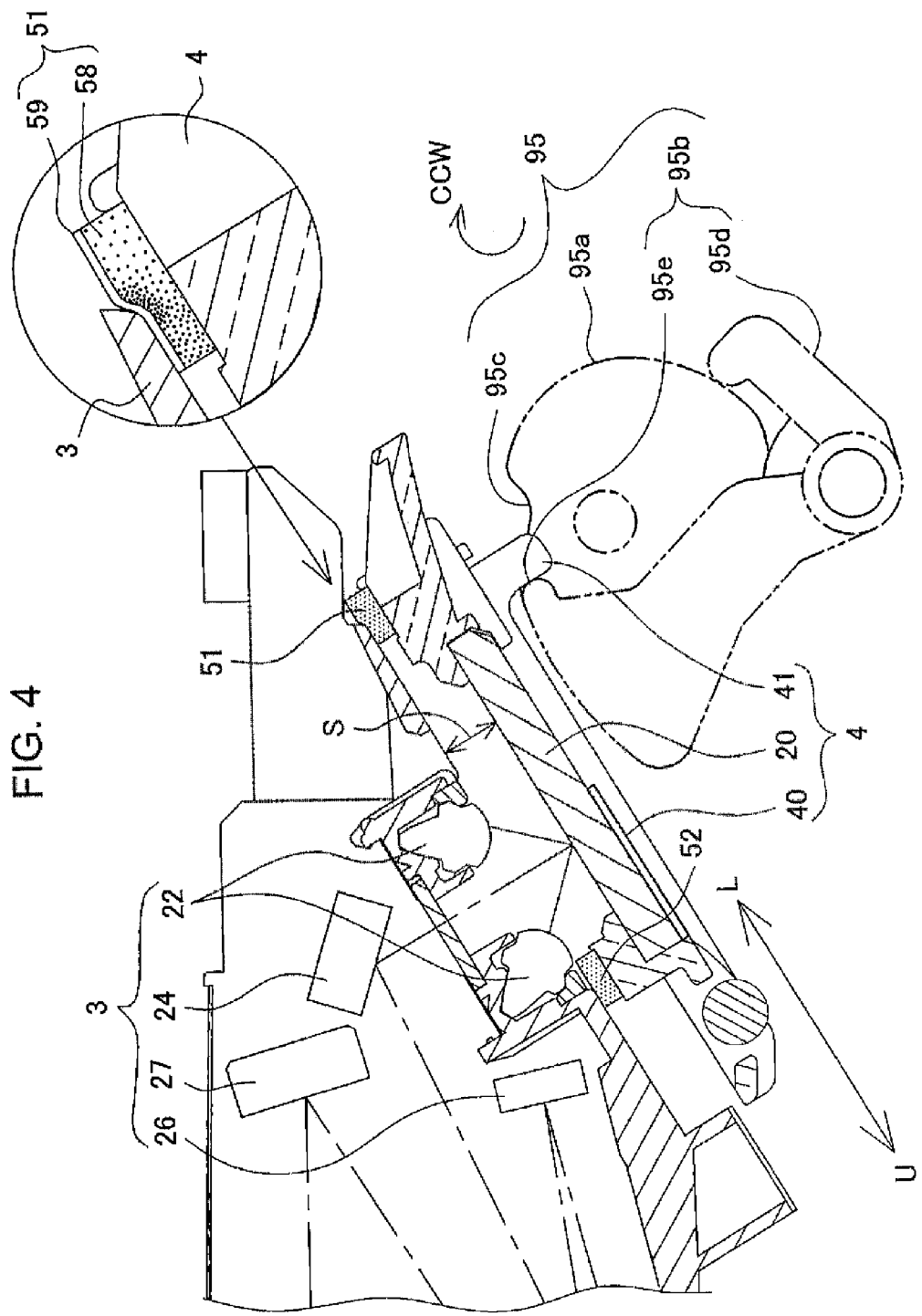
FIG. 4 is a view illustrating a state where the glass unit of FIG. 3 is slid in a downstream side.

FIG. 3 is a view illustrating, in an enlarged manner, a part of the reading unit 3 illustrated in FIG. 2 and the glass unit 4 and the like illustrated in FIG. 2. Also in FIG. 3, the glass unit 4 is situated at the first position where the light emitted from the light source provided in the reading unit 3 transmits the third glass plate 20. FIG. 4 is a view illustrating a state where the glass unit 4 is slid in the downstream side and situated at a second position. In a state where the glass unit 4 is situated at the second position, the reading unit 3 acquires a reference value for the shading correction. A part surrounded by a circle in FIG. 4 will be described later.

As illustrated in FIGS. 3 and 4, the second document reading device A further has a slide driving section 95 for sliding the glass unit 4 in the slide direction UL. In FIGS. 3 and 4, the slide driving section 95 is indicated by a long dashed double-short dashed line. The slide driving section 95 has a cam 95a and a driving portion 95b. The cam 95a is rotated in one direction (rotation direction COW) by a not illustrated driving section such as a motor. A concave portion 95c is formed in the cam 95a. The driving portion 95b has a protruding portion 95d and a drive lever 95e. The glass unit 4 further has a unit lever 41 protruding downward.

The drive lever 95e has a spring which is contracted in the rotation direction CCW. The spring is not illustrated. When the cam 95a is rotated in the rotation direction CCW, the drive lever 95e is rotated in the same direction as the rotation direction CCW and is, thereafter, brought into contact with the unit lever 41 to press the unit lever 91 downstream (in the direction of L). As a result, the glass unit 4 is slid from the first position to the second position. When the cam 95a is further rotated, the protruding portion 95d of the driving portion 95b is fitted into the concave portion 95c formed in the cam 95a, and the drive lever 95e is rotated in a direction opposite to the rotation direction CCW by force of the spring provided in the drive lever 95e, with the result that the drive lever 95e is released from the unit lever 41. When the drive lever 95e is released from the unit lever 41, downstream force applied to the glass unit 4 is released, causing the glass unit 4 to return to the first position.

As illustrated in FIGS. 2, 3, and 4, the second document reading device A further has a downstream side closing member 51 and an upstream side closing member 52. The downstream side closing member 51 is positioned downstream of the third glass plate 20 of the glass unit 4 regardless of whether the glass unit 4 is situated at the first position or second position. The expression "positioned downstream of the third glass plate 20" means that the downstream side closing member 51 is positioned downstream of a part of the third glass plate 20 where the light emitted from the light source provided in the reading unit 3 and reflected light from the document are transmitted. The downstream side closing member 51 is attached to a part of the glass unit 4 on the reading unit 3 side. The downstream side closing member 51 fills a part of the space S between the reading unit 3 and the glass unit 4.

The upstream side closing member 52 is configured similarly to the downstream side closing member 51 and is positioned upstream of the third glass plate 20 of the glass unit 4 regardless of whether the glass unit 4 is situated at the first position or second position. The expression "positioned upstream of the third glass plate 20" means that the upstream side closing member 52 is positioned upstream of a part of the reference member 40 attached to the third glass plate 20 that the light emitted from the light source provided in the reading unit 3 reaches. Like the downstream side closing member 51, the upstream side closing member 52 is attached to a part of the glass unit 4 on the reading unit 3 side so as to fill a part of the space S between the reading unit 3 and the glass unit 4.

Figure 5:
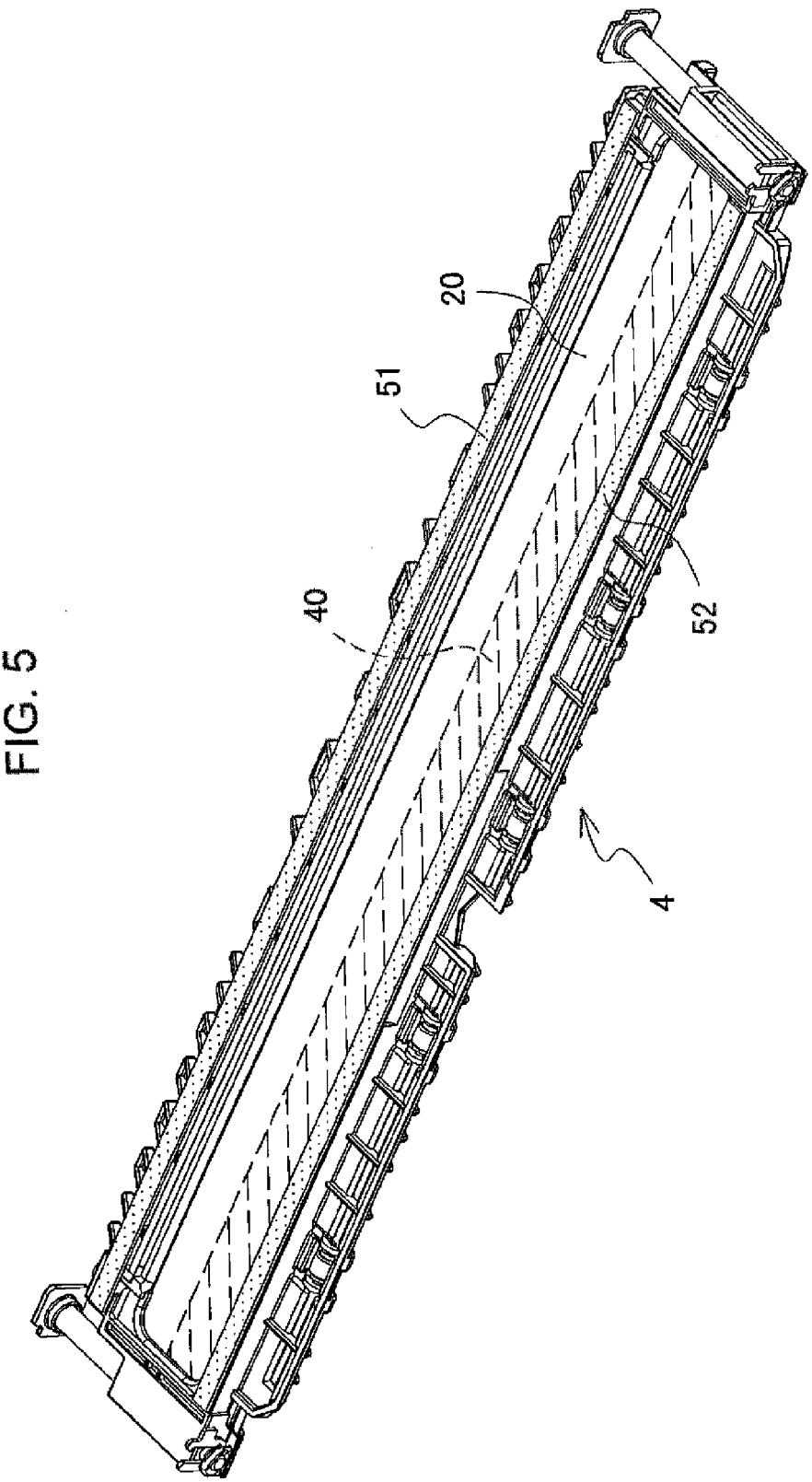
FIG. 5 is a perspective view of the glass unit illustrated in FIG. 2 and the like as viewed from above.

FIG. 5 is a perspective view of the glass unit 4 illustrated in FIG. 2 and the like as viewed from above. The downstream side closing member 51 and the upstream side closing member 52 each have a width extending from one end to the other end of a width of the third glass plate 20 in the glass unit 4.

Referring back to FIGS. 2, 3, and 4, the downstream side closing member 51 is disposed so as to contact the reading unit 3 over the entire width direction and to hide the entire third glass plate 20 of the glass unit 4 from a downstream side of the downstream side closing member 51. That is, the downstream side closing member 51 partitions the space S, in the document conveying direction, into an upstream side where the third glass plate 20 is included and a downstream side where the third glass plate 20 is not included.

The upstream side closing member 52 also contacts the reading unit 3 over the entire width direction. The upstream side closing member 52 hides a part of the reference member 40 attached to the third glass plate 20 on the downstream side of a part thereof that the light emitted from the reading unit 3 reaches from an upstream side of the part that the light emitted from the reading unit 3 reaches. That is, the upstream side closing member 52 partitions the space S, in the document conveying direction, into a downstream side where the part of the reference member 40 that the light emitted from the light source of the reading unit 3 reaches is included and an upstream side where the part that the light emitted from the light source of the reading unit 3 reaches is not included.

As illustrated in an enlarged part surrounded by a circle of FIG. 4, the downstream side closing member 51 has a mounting member 58 formed of an elastic body and a contacting member 59. The mounting member 58 constitutes a part of the downstream side closing member 51 that is mounted to the glass unit 4. The mounting member 58 is formed of, e.g., a synthetic resin sponge. The contacting member 59 constitutes a part of the downstream side closing member 51 that contacts the reading unit 3. The contacting member 59 is formed of, e.g., a thin film. A friction coefficient between the reading unit 3 and the contacting member 59 is smaller than a friction coefficient between the reading unit 3 and the mounting member 58. The upstream side closing member 52 is configured similarly to the downstream side closing member 51 as described above and has a mounting member 58 and a contacting member 59, although not illustrated.

Figure 6:
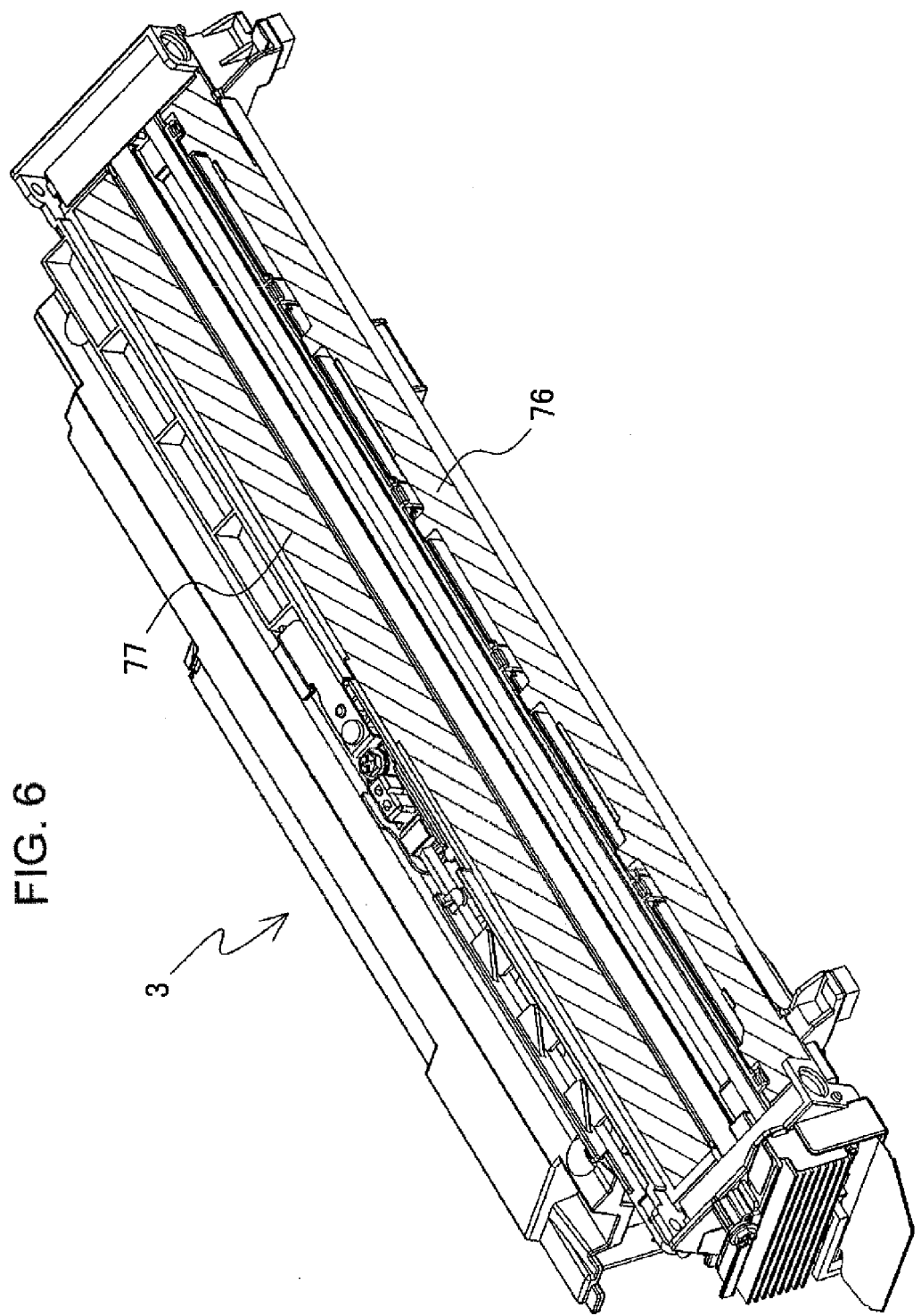
FIG. 6 is a perspective view of the reading unit illustrated in FIG. 2 and the like as viewed from below.

FIG. 6 is a perspective view of the reading unit 3 illustrated in FIG. 2 and the like as viewed from below. In FIG. 6, a downstream side contacting portion 76 of the reading unit 3 that contacts the downstream side closing member 51 and an upstream side contacting portion 77 of the reading unit 3 that contacts the upstream side closing member 52 are each represented by a hatched area. The downstream side contacting portion 76 includes the entire area that the downstream side closing member 51 contacts when the glass unit 4 is slid between the first and second positions. The upstream side contacting portion 77 includes the entire area that the upstream side closing member 52 contacts when the glass unit 4 is slid between the first and second positions. The downstream side contacting portion 76 and the upstream side contacting portion 77 are each applied with a volatile lubricant.

As described above, the second document reading device A in the present embodiment has the reading unit 3 including the light source, the glass unit 4 including the third glass plate 20 and the reference member 40, and the downstream side closing member 51. The glass unit 4 is disposed with the space S provided with respect to the reading unit 3 and is configured to be slidable, with the space S being maintained, between the first position where the light emitted from the light source provided in the reading unit 3 transmits the third glass plate 20 and the second position where the light emitted from the light source reaches the reference member 40. The downstream side closing member 51 is positioned downstream of the third glass plate 20 and the reference member 40 regardless of whether the glass unit 4 is situated at the first position or the second position and fills a part of the space S between the reading unit 3 and the glass unit The third glass plate 20 and the reference member 40 are hidden by the downstream side closing member 51 from the downstream side of the second document reading device A. That is, the downstream side closing member 51 partitions the space S, in the document conveying direction, into the upstream side where the third glass plate 20 is included and the downstream side where the third glass plate 20 is not included. This can prevent foreign matters such as dust from entering inside the second document reading device A from the downstream side of the second document reading device A through the space S. The second document reading device A has the reference member 40, so that by acquiring the reference value for the shading correction in a state where the glass unit 4 is situated at the second position, the shading correction of the reading optical system can be performed.

Figure 7A:
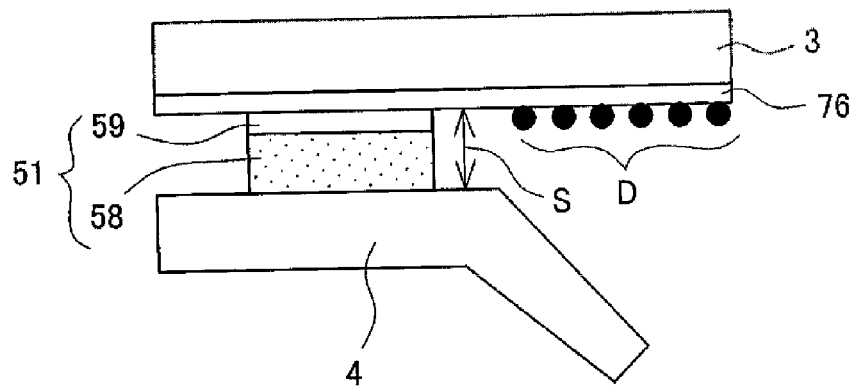
FIG. 7A is a cross-sectional view of a part of the reading unit and a part of the glass unit in a state where the glass unit of a second document reading device A illustrated in FIG. 1 and the like is situated at a first position.
Figure 7B:
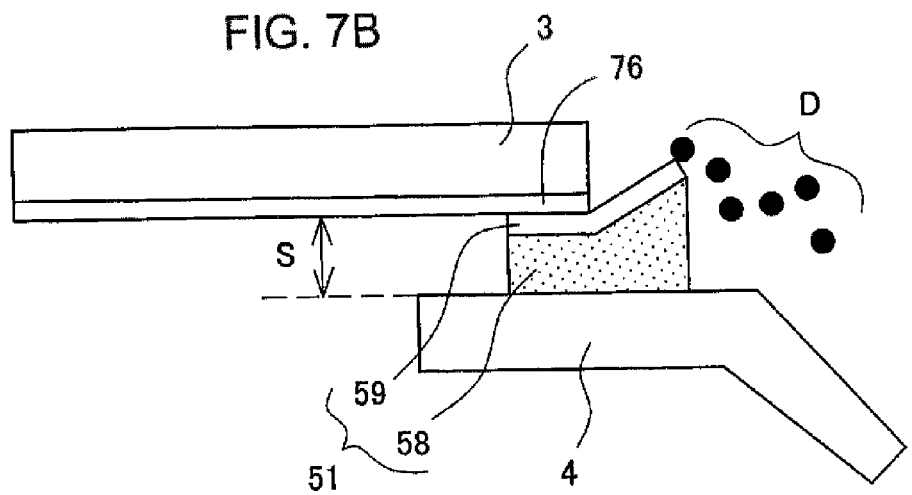
FIG. 7B is a cross-sectional view of a part of the reading unit and a part of the glass unit in a state where the glass unit in FIG. 7A has been slid downward to the second position from the first position.
Figure 7C:
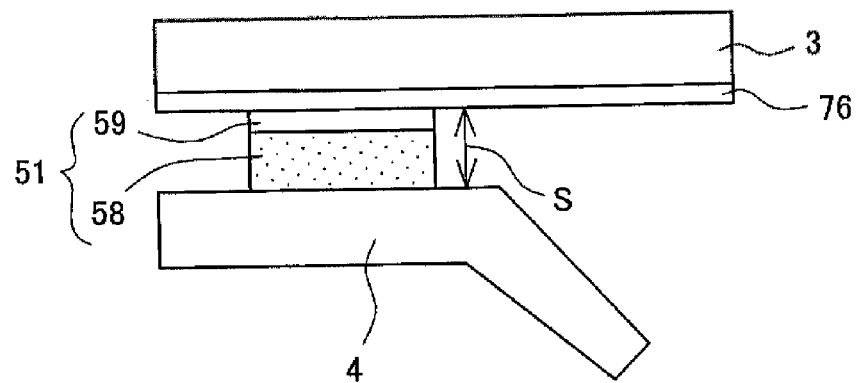
FIG. 7C is a cross-sectional view a part of the reading unit and a part of the glass unit in a state where the glass unit in FIG. 7B has been restored to the first position from the second position.

Effects of the second document reading device A in the present embodiment will be described using FIGS. 7A to 7C. FIGS. 7A to 7C are views for explaining effects of the second document reading device A illustrated in FIG. 1 and the like. Specifically, FIG. 7A is a cross-sectional view of a part of the reading unit 3 and a part of the glass unit 4 in a state where the glass unit 4 of the second document reading device A illustrated in FIG. 1 and the like is situated at the first position. FIG. 7B is a cross-sectional view of a part of the reading unit 3 and a part of the glass unit 4 in a state where the glass unit 4 in FIG. 7A has been slid downstream to the second position from the first position. FIG. 7C is a cross-sectional view a part of the reading unit 3 and a part of the glass unit 4 in a state where the glass unit 4 in FIG. 7B has been restored to the first position from the second position.

As illustrated in FIG. 7A, there is assumed a case where foreign matters D such as dust are adhered to a surface of the reading unit 3 opposed to the glass unit 4 at a portion thereof on the downstream side portion of the downstream side closing member 51. The second document reading device A has the downstream side closing member 51, so that when the glass unit 4 is situated at the first position, the foreign matters D are prevented from entering inside the second document reading device A through the space S. When the glass unit 4 is slid from the first position to the second position, the downstream side closing member 51 is correspondingly slid downstream side, as illustrated in FIG. 7B, with the result that the foreign matters D are pushed downstream and discharged outside the second document reading device A.

At this time, as illustrated in the part surrounded by the circle of FIG. 4, a downstream side part of the downstream side closing member 51 is positioned downstream of a downstream end portion of the reading unit 3. The downstream side closing member 51 has the mounting member 58 formed of an elastic member, and thus a part of the mounting member 58 that exceeds the downstream end portion of the reading unit 3 in the downstream direction is expanded from a contracted state. With this action, the mounting member 58 discharges the foreign matters D outside the second document reading device A vigorously.

When the glass unit 4 is slid from the second position to the first position, the downstream side closing member 51 is slid upstream along with the slide of the glass unit 4, as illustrated in FIG. 7C, with the result that the expanded portion of the mounting member 58 formed of the elastic body is contracted to fill a part of the space S. This can prevent the foreign matters D from entering inside the second document reading device A from the downstream side through the space S.

In addition, in the above embodiment, the downstream side contacting portion 76 and the upstream side contacting portion 77 of the reading unit 3 are each applied with a volatile lubricant. Thus, when the glass unit 4 is slid, the downstream side closing member 51 and upstream side closing member 52 can be smoothly slid. That is, the glass unit 4 can be smoothly slid by application of the lubricant.

As described above, the downstream side contacting portion 76 is applied with the lubricant, so that the downstream side closing member 51 can be smoothly slid by application of the lubricant. That is, the friction force between the downstream side closing member 51 and the downstream side contacting portion 76 is small, so that static electricity is unlikely to occur in both the downstream side closing member 51 and the downstream side contacting portion 76. Thus, foreign matters such as dust are unlikely to be adhered to the lubricant and the downstream side closing member 51. Thus, when the glass unit 4 is slid to the first position to cause a part of the downstream side contacting portion 76 to be positioned downstream of the downstream side closing member 51, the foreign matters are unlikely to be drawn inside the second document reading device A by the lubricant and the downstream side closing member 51.

In addition, the downstream side contacting portion 76 is applied with the volatile lubricant. The lubricant scarcely contains liquid or a component near the liquid, so that the foreign matters such as dust is unlikely to be adhered to the lubricant. Thus, when the glass unit 4 is slid to the first position to cause a part of the downstream side contacting portion 76 to be positioned downstream of the downstream side closing member 51, the foreign matters are unlikely to be drawn inside the second document reading device A by the lubricant.

Further, in the above embodiment, the downstream side closing member 51 has the mounting member 58 formed of an elastic body. Thus, the mounting member 58 can be contracted, so that by setting a size of the mounting member 58 slightly larger, even if a dimension of the space S between the reading unit 3 and glass unit 4 slightly differs from that planned before production because of design matters, the downstream side closing member 51 can be brought into contact with the reading unit 3. This can prevent foreign matters such as dust from entering inside the second document reading device A through the space S.

Further, in the above embodiment, the downstream side closing member 51 has the contacting member 59. The contacting member 59 constitutes a part of the downstream side closing member 51 that contacts the reading unit 3. The friction coefficient between the reading unit 3 and the contacting member 59 is smaller than that between the reading unit 3 and the mounting member 58. The downstream side closing member 51 has the contacting member 59 having such properties and can thus be slid more smoothly while contacting the reading unit 3 than in a case where the downstream side closing member 51 does not have the contacting member 59. That is, the glass unit 4 can be slid smoothly by means of the contacting member 59. That is, friction force between the downstream side closing member 51 and the downstream side contacting portion 76 is small, so that static electricity is unlikely to occur in both the downstream side closing member 51 and the downstream side contacting portion 76. Thus, foreign matters such as dust are unlikely to be adhered to the downstream side contacting portion 76 and the downstream side closing member 51. Thus, when the glass unit 4 is slid to the first position to cause a part of the downstream side contacting portion 76 to be positioned downstream of the downstream side closing member 51, the foreign matters are unlikely to be drawn inside the second document reading device A by the downstream side contacting portion 76 or the downstream side closing member 51.

The upstream side closing member 52 is configured similarly to the downstream side closing member 51, as described above and can thus be slid more smoothly while contacting the reading unit 3 than in a case where the upstream side closing member 52 does not have the contacting member 59. That is, the glass unit 4 can be slid smoothly by means of the contacting member 59. In addition, a part of the reference member 40 that the light emitted from the light source of the reading unit 3 reaches is hidden from the upstream side of the part that the light emitted from the reading unit 3 reaches. That is, the upstream side closing member 52 partitions the space S, in the document conveying direction, into the downstream side where the part of the reference member 40 that the light emitted from the light source of the reading unit 3 reaches is included and the upstream side where the part that the light emitted from the light source of the reading unit 3 reaches is not included. This can prevent foreign matters such as dust from entering inside the second document reading device A from the upstream side of the part that the light emitted from the reading unit 3 reaches through the space S. Thus, the upstream side closing member 52 is configured similarly to the downstream side closing member 51, so that the same effect as that obtained by the downstream side closing member 51 can be obtained also by the upstream side closing member 52.

In the above embodiment, the downstream side closing member 51 attached to the glass unit 4 contacts the reading unit 3, so that the third glass plate 20 and the reference member 40 are hidden by the downstream side closing member 51 from the downstream side of the second document reading device A. That is, the downstream side closing member 51 partitions the space S, in the document conveying direction, into the upstream side where the third glass plate 20 is included and the downstream side where the third glass plate 20 is not included. However, the downstream side closing member 51 need not contact the reading unit 3. That is, the space S need not be completely partitioned by the downstream side closing member 51 into the upstream side and the downstream side. In other words, the downstream side closing member 51 need not have a height high enough to contact the reading unit 3. In addition, in the above embodiment, the downstream side closing member 51 has a width extending from one end to the other end of the width of the third glass plate 20 in the glass unit 4. However, the width of the downstream side closing member 51 may be shorter than the length extending from the one end to the other end of the third glass plate 20 in the glass unit 4. Further, the downstream side closing member 51 need not be one continuous member but may be composed of a plurality of members. In this case, the plurality of members constituting the downstream side closing member 51 are attached to the glass unit 4 in a state where they are arranged at intervals with each other.

In the above case, although the third glass plate 20 and the reference member 40 are not entirely hidden from the downstream side of the second document reading device A, they are partially hidden from the downstream side of the second document reading device A. Thus, it is possible to make it more difficult for the foreign matters such as dust to enter inside the second document reading device A from the downstream side through the space S than in a case where the second document reading device A does not have the downstream side closing member 51.

The width of the downstream side closing member 51 may be larger than the length extending from the one end to the other end of the third glass plate 20 in the glass unit 4.

As described above, the downstream side closing member 51 need not contact the reading unit 3. In other words, the downstream side closing member 51 need not have a height high enough to contact the reading unit 3. In the present embodiment, the reading unit 3 is positioned above the glass unit 4, and the downstream side closing member 51 is attached to the glass unit 4. The foreign matters such as dust may move downward by gravity. Thus, even if the downstream side closing member 51 does not contact the reading unit 3, the configuration in which the downstream side closing member 51 is attached to the glass unit 4 positioned below the reading unit 3 makes it difficult for the foreign matters to enter inside the second document reading device A from the downstream side through the space S.

Although the reading unit 3 is positioned above the glass unit 4 in the above embodiment, the reading unit 3 may be positioned below the glass unit 4.

In the above embodiment, the downstream side contacting portion 76 and the upstream side contacting portion 77 are applied with the volatile lubricant. The lubricant is not limited to a type to be applied. The lubricant may be a liquid substance and be dripped on the downstream side contacting portion 76 and the upstream side contacting portion 77. The point is that the lubricant is preferably positioned on one or both of the downstream side contacting portion 76 and the upstream side contacting portion 77. In addition, the lubricant to be used in the present embodiment is not limited to the volatile lubricant.

In the above embodiment, the downstream side closing member 51 has the mounting member 58 formed of an elastic member and the contacting member 59. However, the downstream side closing member 51 need not have the contacting member 59. The upstream side closing member 52 also need not have the contacting member 59. In addition, the mounting member 58 need not be formed of the elastic member. That is, one or both of the downstream side closing member 51 and the upstream side closing member 52 need not have the elastic body.

In the above embodiment, the reference member 40 is white colored. However, the color of the reference member 40 is not limited to white. For example, the reference member 40 may be gray colored. In either case, the reference member 40 serves as a reference for the shading correction of the reading optical system performed by the reading unit. In addition, in the above embodiment, the reference member 40 is attached to the upstream side of the one surface of the third glass plate 20. However, the reference member 40 may be attached to the downstream side of the one surface of the third glass plate 20. The one surface of the third glass plate 20 to which the reference member 40 is attached may be any one of two surfaces of the third glass plate 20. Further, the reference member 40 need not be attached to one surface of the third glass plate 20. For example, the plate-like reference member 40 may be attached to a side surface of the third glass plate 20 such that the plate-like reference member 40 and the third glass plate 20 are arranged side by side in one plane.

In the above embodiment, the downstream side closing member 51 is attached to the glass unit 4. However, the downstream side closing member 51 may be attached to the reading unit 3. In a case where the downstream side closing member 51 is attached to the reading unit 3, the downstream side closing member 51 is not slid even when the glass unit 4 is slid. In the case where the downstream side closing member 51 is attached to the reading unit 3, the mounting member 58 of the downstream side closing member 51 is attached to the reading unit 3, and the downstream side contacting portion 76 is positioned on the glass unit 4 side. Similarly, the upstream side closing member 52 may be attached to the reading unit 3. In a case where the upstream side closing member 52 is attached to the reading unit 3, the upstream side closing member 52 is not slid even when the glass unit 4 is slid. In the case where the upstream side closing member 52 is attached to the reading unit 3, the mounting member 58 of the upstream side closing member 52 is attached to the reading unit 3, and the upstream side contacting portion 77 is positioned on the glass unit 4 side.

As described above, the downstream side closing member 51 and the upstream side closing member 52 maybe attached either to the glass unit 4 or the reading unit 3. That the downstream side closing member 51 is attached to the glass unit 4 means that the downstream side closing member 51 may be integrated with the glass unit 4. In other words, the downstream side closing member 51 may be a part of the glass unit 4. Similarly, that the downstream side closing member 51 is attached to the reading unit 3 means that the downstream side closing member 51 maybe integrated with the reading unit 3. That is, the downstream side closing member 51 may be a part of the reading unit 3. The same can be said for the upstream side closing member 52. That is, that the upstream side closing member 52 is attached to the glass unit 4 means that the upstream side closing member 52 may be integrated with the glass unit 4, and that the upstream side closing member 52 is attached to the reading unit 3 means that the upstream side closing member 52 may be integrated with the reading unit 3. In other words, the upstream side closing member 52 may be a part of the glass unit 4 or the reading unit 3.

The present invention is not limited to the above embodiment, but various modifications may be made to the embodiment. Such modifications are not excluded from a technical scope of the present invention.

INDUSTRIAL APPLICABILITY

The present invention relates to a document reading device and thus has industrial applicability.

REFERENCE SIGNS LIST

H: First document reading device
A: Second document reading device
1a: First glass plate
1b: Second glass plate
2: Reading carriage
3: Reading unit
4: Glass unit
10: Sheet supply tray
11: Sheet discharge tray
12: Document conveying path
12a: Sheet supply port
12b: Sheet discharge port
13: Delivery roller
14: Feeding roller
15: Separation roller
16: Resist roller pair
16A, 16B: Resist roller pair
17: Conveying roller pair
18: Conveying roller pair
19: Discharge roller pair
20: Third glass plate
21: Protective glass
22: Light guide body
24, 25, 26, 27: Mirror
28: Lens
29: Photoelectric conversion element (CCD)
30: First frame
31: CCD substrate
32: Second frame
32a: Slit
40: Reference member
41: Unit lever
51: Downstream side closing member
52: Upstream side closing member
58: Mounting member
59: Contacting member
60: Optical unit
61: Light source unit
70: Separation guide unit
72: Regulation wall
76: Downstream side contacting portion
77: Upstream side contacting portion
80: Sheet feed cover unit
81: Sheet feed cover
82: Pivotal pin
95: Slide driving section
95a: cam
95b: Driving section
95c: Concave portion
95d: Protruding portion
95e: Drive lever
S: Space
UL: Slide direction
CCW: Rotation direction
D: Foreign matters

The invention claimed is:

1. A document reading device, comprising:
a reading unit that has a light source and reads a conveyed document;
a glass unit that has a glass plate that transmits light emitted from the light source provided in the reading unit and a reference member serving as a reference for shading correction of a reading optical system performed by the reading unit, the glass unit being disposed with a space provided with respect to the reading unit and slid between a first position where the light emitted from the light source transmits through the glass plate and a second position where the light emitted from the light source reaches the reference member with the space being maintained; and
a closing member that is positioned downward of the glass plate and the reference member of the glass unit in a document conveying direction regardless of whether the glass unit is situated at the first position or the second position and attached to the glass unit so as to fill at least a part of the space provided between the reading unit and the glass unit,
wherein the closing member comprises an elastic member, and
the glass unit slides so that a part of the closing member that exceeds a downstream end portion of the reading unit expands from a contracted state.

2. The document reading device according to claim 1, wherein the closing member has a width extending at least from one end to the other end of a width of the glass plate of the glass unit and is disposed so as to contact the reading unit over the entire width direction and to partition the space in the document conveying direction into an upstream side where the glass plate and the reference member of the glass unit are included and a downstream side where the glass plate and the reference member of the glass unit are not included.

3. The document reading device according to claim 1, further comprising a lubricant, wherein
 the closing member contacts the glass unit, and
 the lubricant is positioned on the reading unit at a portion contacting the closing member.

4. The document reading device according to claim 3, wherein the lubricant has volatility.

5. The document reading device according to claim 4, wherein
 the closing member further has a contacting member that contacts the reading unit, and
 a friction coefficient between the reading unit and the contacting member is smaller than a friction coefficient between the glass unit and the elastic member.

6. The document reading device according to claim 1, wherein
 in the first position, the closing member is completely compressed, and
 in the second position, a part of the closing member is completely compressed, and the part of the closing member that exceeds the downstream end portion of the reading unit expands.

7. The document reading device according to claim 6, wherein the closing member further comprises a contacting member that contacts the reading unit.

\* \* \* \* \*